United States Patent [19]

Nash et al.

[11] 4,000,610
[45] Jan. 4, 1977

[54] FLIGHT MANEUVERABLE NOZZLE FOR GAS TURBINE ENGINES

[75] Inventors: Dudley O. Nash, Forest Park; Robert G. Beavers, Mason; Joseph C. Burge, Cincinnati; Onofre T. M. Castells, Sharonville; Alan I. Parker, Cincinnati, all of Ohio

[73] Assignee: General Electric Company, Cincinnati, Ohio

[22] Filed: Apr. 28, 1975

[21] Appl. No.: 572,340

[52] U.S. Cl. .................. 60/230; 60/232; 60/271; 239/265.27; 239/265.39; 244/12.5
[51] Int. Cl.² ............... F02K 1/12; F02K 1/20
[58] Field of Search ........... 60/230, 232, 271, 242; 239/265.33, 265.35, 265.37, 265, 39, 265.41, 265.27, 265.43; 244/12 D

[56] References Cited

UNITED STATES PATENTS

| | | | |
|---|---|---|---|
| 2,891,740 | 6/1959 | Campbell | 244/12 D |
| 3,019,601 | 2/1962 | Sens | 239/265.37 |
| 3,046,730 | 7/1962 | Petren | 239/265.39 |
| 3,258,206 | 6/1966 | Simonson | 244/12 D |
| 3,302,889 | 2/1967 | Di Sabato | 239/265.39 |
| 3,380,660 | 4/1968 | Markowski | 239/265.27 |
| 3,390,837 | 7/1968 | Freeman | 239/265.41 |
| 3,409,250 | 11/1968 | Ammer et al. | 239/265.41 |
| 3,524,588 | 8/1970 | Duval | 239/265.41 |
| 3,527,408 | 9/1970 | Markowski | 239/265.27 |
| 3,558,058 | 1/1971 | Lennard et al. | 60/230 |
| 3,756,542 | 9/1973 | Bertin | 60/230 |

FOREIGN PATENTS OR APPLICATIONS

| | | | |
|---|---|---|---|
| 1,283,690 | 3/1961 | France | 239/265.35 |
| 1,119,126 | 3/1960 | Germany | 239/265.37 |

*Primary Examiner*—Carlton R. Croyle
*Assistant Examiner*—Robert E. Garrett
*Attorney, Agent, or Firm*—Robert C. Lampe, Jr.; Derek P. Lawrence

[57] ABSTRACT

A flight maneuverable gas turbine exhaust nozzle is provided with cooperating variable internal converging-diverging flaps to provide area control. A flap downstream of the converging-diverging flap provides flight maneuver vectoring as well as external exhaust expansion control. A vertical take-off and landing capability is provided by deployment of a rotating bonnet-type deflector which diverts the exhaust stream downward around one side of the exhaust nozzle. The nozzle throat rotates with the deflector to produce efficient turning of the exhaust stream.

13 Claims, 5 Drawing Figures

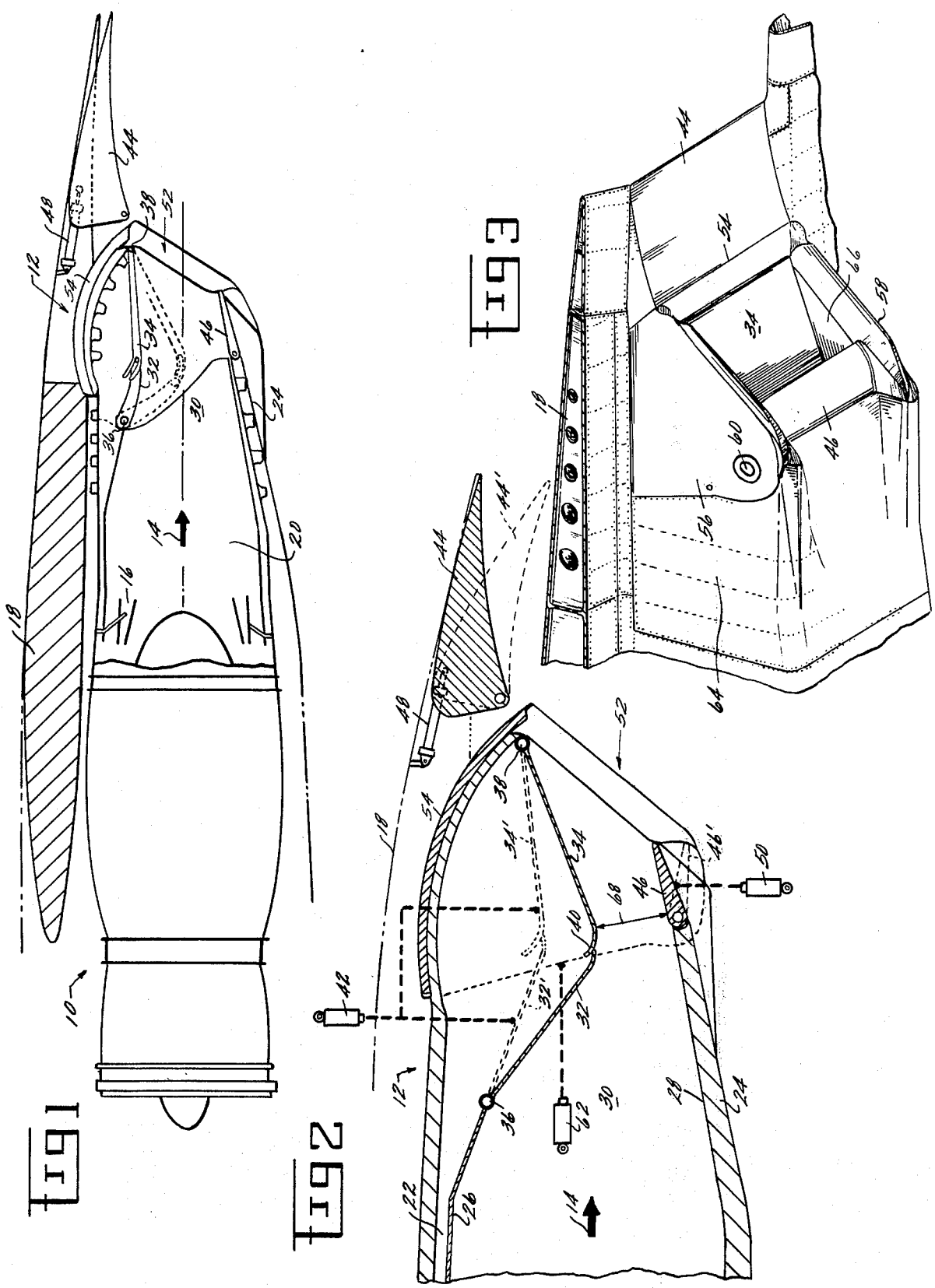

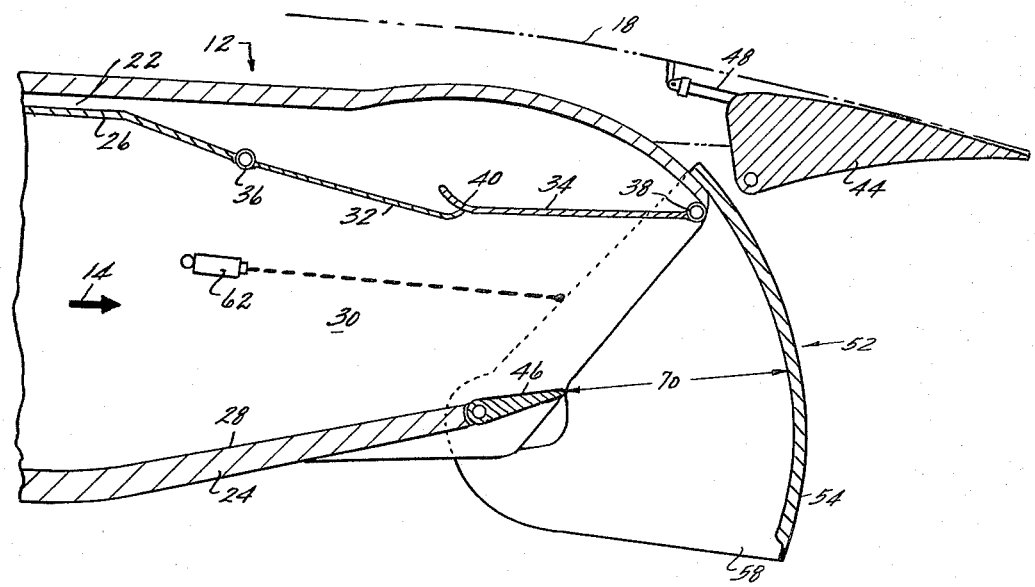
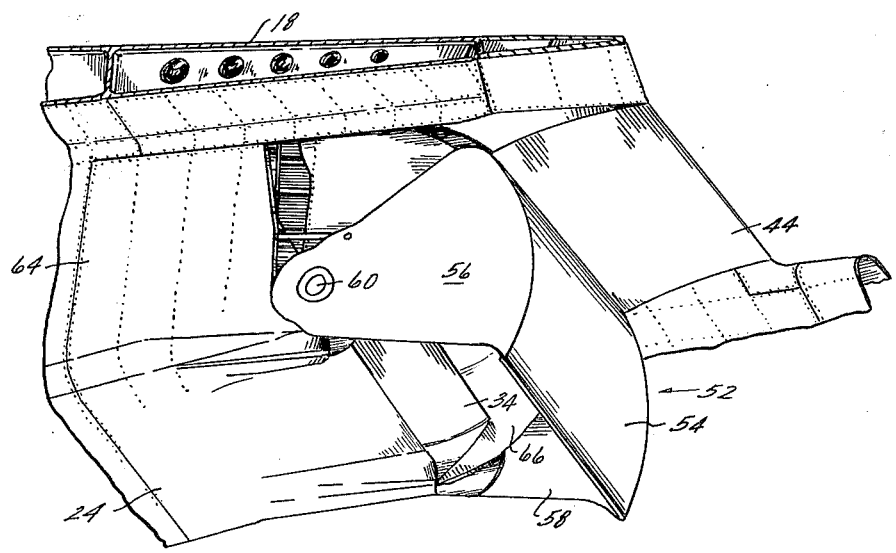

FLIGHT MANEUVERABLE NOZZLE FOR GAS TURBINE ENGINES

The invention herein described was made in the course of or under a contract or subcontract thereunder (or grant) with the Department of the Navy.

BACKGROUND OF THE INVENTION

This invention relates to gas turbine engines and, more particularly, to thrust vectorable nozzles for use therein.

The high velocity imparted to the exhaust gases of a gas turbine engine by the exhaust nozzle provides the thrust for propulsion. This thrust is substantially parallel with, and opposite to the direction of, exhaust gases exiting the nozzle. Consequently, if the direction of the exhaust gases is changed, the direction of propulsive thrust is correspondingly varied. Typically, aircraft gas turbine engines are provided with nozzles which are fixed in the axial direction, and aircraft maneuvering is accomplished solely by airframe control surfaces.

Advanced aircraft configurations contemplate, and may even require, the selective redirection (or vectoring) of gas turbine engine thrust in order to enhance aircraft performance and to provide the aircraft with operational characteristics heretofore deemed impractical. For example, if the exhaust of a conventionally installed gas turbine engine was directed downward, rather than rearward, to a direction substantially perpendicular to the engine longitudinal axis, the resulting upward thrust would provide direct lift for the aircraft and, therefore, a vertical take-off and landing capability. Similarly, thrust vectoring during flight can greatly increase aircraft maneuverability since the thrust force can augment the manuevering forces of the aircraft control surfaces such as elevators, ailerons and rudders. In order to accomplish such thrust vectoring, a device is required to efficiently and practically alter the direction of gas turbine engine exhaust nozzle gases.

The concept of thrust vectoring by itself is not new since exhaust nozzles with this capability have been considered for years, and a wide variety of thrust vectorable nozzles have evolved. However, these nozzles have typically included one or more of the following limitations:

- discontinuous vectoring between the cruise mode and the lift mode;
- air frame doors required to accommodate exhaust deflectors in at least one operational mode;
- low lift thrust available when compared to the required weight addition of the basic cruise engine;
- excessive complexity;
- excessive downward projection in the lift mode resulting in ground clearance problems; and
- slow vector angle and nozzle area rate of variation.

The problem facing the gas turbine engine designer, therefore, is to provide a flight maneuverable exhaust nozzle which avoids all of the above limitations.

SUMMARY OF THE INVENTION

Accordingly, it is the primary object of the present invention to provide an exhaust nozzle having highly efficient turning and which will provide continuous thrust vectoring between vertical take-off(lift), in-flight maneuvering and conventional cruise modes.

It is further object of this invention to provide a thrust vectorable nozzle of reduced complexity and possessing an aerodynamically efficient envelope.

It is yet another object of this invention to provide an improved method of operating a thrust vectorable nozzle.

These and other objects and advantages will be more clearly understood from the following detailed description, drawings and specific examples, all of which are intended to be typical of rather than in any way limiting to the scope of the present invention.

Briefly stated, the above objectives are accomplished by means of an exhaust device which, in one form, consists of a two-dimensional (substantially rectangular), external expansion-type cruise nozzle with internal area variation provided by cooperating convergent-divergent variable flaps. A flap, conveniently a wing flap, located downstream of the convergent-divergent flaps provided flight maneuver vectoring as well as exhaust flow expansion control. A variable area ventral flap located downstream of and opposite to the convergent and divergent flaps provides nozzle throat area control in the lift mode and provides additional expansion area control in the cruise mode.

For vertical take-off and landing or short take-off and landing operation (V/STOL), a rotating bonnet-type deflector is used to deflect the exhaust stream downward. This deflector is stowed externally to the smooth internal flow path during cruise operation so as not to compromise performance and to simplify cooling during afterburning (or "augmented") operation. The nozzle throat is adapted to rotate with the deflector to produce efficient turning of the exhaust stream.

DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiments which is given by way of example with the accompanying drawings, in which:

FIG. 1 diagrammatically depicts a wing-mounted gas turbine engine incorporating the present invention;

FIG. 2 depicts schematically the exhaust device of the present invention in several operating modes;

FIG. 3 is an isometric view of the wing-mounted exhaust device in an operating mode of FIG. 2;

FIG. 4 is a schematic representation, similar to FIG. 2, and depicting the present invention in a vertical take-off mode; and FIG. 5 is an isometric view, similar to FIG. 3, of the exhaust device of FIG. 4.

DESCRIPTION OF THE PREFERRED EMBODIMENT

Referring to the drawings wherein like numerals correspond to like elements throughout, attention is first directed to FIG. 1 wherein a gas turbine engine, depicted generally at 10, and embodying the present invention is diagrammatically shown. Hot gases of combustion are expanded through a turbine (not shown) in a manner well known in the art and enters exhaust device 12 from the left as depicted by vector 14. (As used hereinafter, the term "exhaust device" is meant to include a fan duct exhaust nozzle, or any other gas turbine engine exhaust nozzle whether or not it is preceded in serial flow relationship by a combustor. In the embodiment of FIG. 1 the gas turbine engine has been augmented by an afterburner 16 of a variety known in the art.) After passing through exhaust device 12, the flow is vectored from the device in a manner to be described.

Referring now to FIGS. 2 and 4 wherein the exhaust device of FIG. 1 is shown schematically in greater detail, it is apparent that the exhaust device is of the two-dimensional variety, in this embodiment, having a substantially rectangular cross section. While the present invention is not meant to be limited to devices of rectangular cross section, as it will become apparent that the invention may be applied to devices having a moderately arcuate cross section, it has been found that a substantially rectangular cross section provides a preferred embodiment for the subject invention. This has the added advantage of permitting the exhaust device to be conformably nested with an aircraft wing 18 as depicted in FIGS. 3 and 5. Since the turbine area of a gas turbine engine is of generally circular cross section, a transition duct section 20 is required between the turbine and exhaust device 12.

The exhaust device is shown to include two substantially opposed walls 22, 24, the wall 22 including a liner 26 in the present embodiment. The inner surfaces 28 of wall 24 and inner surface of wall 22 represented by liner 26 partially define an exhaust stream flow path 30. Wall 22 is further defined by convergent-divergent means comprising cooperating nozzle flaps 32, 34, each hinged at one end, 36, 38, respectively, to wall 22. The other ends are connected, as by roller and cam arrangement, at 40. The exhaust stream flow path 30 area is thus controlled, in part, by the positioning of the nozzle flaps, such as through state-of-the-art actuator means 42.

The variable flap 44 located downstream of the nozzle flaps provides flight manuever vectoring as well as exhaust stream expansion control. As shown, flap 44 comprises a portion of the trailing edge of wing 18, the wing comprising part of the aircraft structure. However, in other embodiments, the flap may be engine- or fuselage-mounted. A variable area ventral flap 46 which forms the downstream extremity of wall 24, cooperates with nozzle flaps 32 and 34 to control the area of exhaust stream flow path 30 and provides exhaust stream expansion control. Further, as will be discussed hereinafter, ventral flap 46 provides nozzle throat area control in the vertical rake-off and landing, and short take-off and landing (V/STOL) modes. Flaps 44 and 46 may be maneuvered by known actuating means 48 and 50, respectively.

For V/STOL operation, a rotating bonnet-type deflector 52 is used to deflect the exhaust stream downward. Deflector 52 possesses a substantially U-shaped cross-sectional profile, as most clearly depicted in FIG. 5, and consists of an arcuate deflector portion 54 flanked by two pie-shaped arm members 56, 58. During cruise operation, the deflector 52 is stowed within wall 22 so that it does not compromise the aerodynamically smooth contours of flow path 30. Thus, it does not affect high cruise nozzle efficiency and simplifies nozzle cooling during augmented (afterburning) operation. In the V/STOL mode, the deflector 52 is rotated about its pivot connections (only one of which is shown at 60) by means of actuator 62 into flow path 30, thereby deflecting the exhaust stream in a downward direction.

In operation, during the flight cruise mode, and wherein for present consideration the afterburner 16 is not in operation, nozzle flaps 32, 34 would be positioned substantially as depicted by solid lines in FIG. 2 such as to cooperate with opposite wall 24 to form a nozzle throat therebetween. Exhaust gas expansion control is obtained on one side by means of divergent nozzle flap 34 and wing flap 44 in cooperating relationship, while ventral flap 46 provides expansion control on the other wall. The remaining sides or lateral wall portions 64, 66 of exhaust device 12 (FIGS. 3 and 5) are of fixed geometry and therefore do not directly contribute to the variability of exhaust stream flow path 30.

Thus, in the flight cruise mode, nozzle area control is provided by varying the nozzle flaps 32, 34, while wing flap 44 and ventral flap 46 must be varied with nozzle pressure ratio to provide efficient expansion of the exhaust flow. For example, in an augmented cruise mode, the nozzle flaps would assume a position substantially similar to that as shown in phantom at 32' and 34' in FIG. 2, while the ventral flap would be opened up as at 46' shown in phantom. It is apparent that in the cruise mode of operation the throat 68 (minimum flow area) is located upstream of flaps 44 and 46, and the direction of thrust is substantially parallel with and opposite in direction to, vector 14.

In-flight thrust vectoring during the cruise mode, whether augmented or unaugmented, is accomplished through variation of the wing flap 44 which causes deflection of the exhaust stream. As flap 44 is rotated downward to the position shown in phantom at 44' in FIG. 2, the exhaust stream impinging thereupon is deflected downward, thus providing an upward component to the thrust vector which supplements aircraft lift created by the conventional control surfaces. This, in turn, greatly enhances aircraft maneuverability. Furthermore, vectoring is accomplished smoothly and continuously, and is independent of engine power setting since the input to actuator 48 is anticipated to be related to the aircraft conventional control surface actuators rather than the engine throttle control.

In the lift mode of operation, the deflector 52 is rotated from its stowed position within wall 24 to a deployed position as indicated in FIGS. 4 and 5. As the exhaust stream impinges upon the arcuate deflector portion 54, the stream is deflected downward approximately perpendicular to the incoming exhaust stream vector 14 thereby providing a substantial upward lifting force. Such lift could be used to provide a vertical take-off capability or, combined with an aircraft forward velocity component, an extremely short take-off roll.

In one form of the present invention, the rotating deflector 52 is operated in conjunction with ventral flap 46 to rotate the plane of the exhaust throat as the deflector 52 is deployed. In particular, the throat is rotated such that the exhaust stream is turned upstream of the throat at velocities substantially lower than sonic so that serious pressure loss in the turn is avoided.

In the cruise mode of FIG. 2, the throat 68 is forward of the ventral flap 46 so that the throat area is independent of the ventral flap position. The ventral flap is then positioned to control supersonic expansion. In the lift mode of FIG. 4, the throat 70 is established by the downstream tip of the ventral flap 46 and the deflector position. Actuators 50 and 62 are synchronized such that the throat rotates with the deflector, one means of synchronization comprising the subject of copending patent application Ser. No. 572,341, assigned to the same assignee as the present invention.

In order to provide a large flow area upstream of the throat for low velocities and efficient flow turning, the nozzle flaps 32, 34 are positioned in an extreme upward position as shown in FIG. 4. Once the deflector 52 is deployed to the lift mode, exhaust stream flow path area is fixed and thrust is modulated by simultaneous variation of engine speed and augmenter fuel flow. This method of thrust modulation produces rapid thrust response for effective control.

Since, in its deployed position, the deflector 52 is disposed aft of the downstream extremity of wall 24 thereby causing the exhaust flow to turn around ventral flap 46, the need for secondary exhaust ports has been eliminated. In prior designs these ports were opened in the lift mode to provide a downward-facing opening for the exhaust stream, and closed by means of complicated door and louver arrangements in the cruise mode. Note that in the deployed position of FIG. 4, the downward projection of the deflector 52 does not substantially reduce vertical ground clearance of the gas turbine engine.

Continuous vectoring between the lift and cruise modes is provided by the present invention since, as the deflector 52 is rotated to its stowed position, the thrust vector is correspondingly rotated to the conventional cruise mode. The wing flap may be programmed to assist in this transition as the deflector nears its stowed position. The rate of vector angle rotation is limited only by the speed of the actuator. The elimination of airframe doors and partial integration into the aircraft structure provides for a lightweight design. That, combined with efficient turning, results in a high thrust-to-weight ratio in the lift mode.

It will be obvious to one skilled in the art that certain changes can be made to the above-described invention without departing from the broad inventive concepts thereof. For example, the invention could be utilized to direct exhaust flow other than downward and may be installed in an aircraft pylon or fuselage. Further, a plurality of telescoping deflector segments could replace the single bonnet-type depicted. It is intended that the appended claims cover these and all over variations in the present invention's broader inventive concepts.

Having thus described the invention, what is claimed as novel and desired to be secured by Letters Patent of the United States is:

1. A flight maneuverable exhaust device for a gas turbine engine including:
   a plurality of substantially opposed walls partially defining an exhaust stream flow path;
   variable position convergent-divergent means partially defining a first of said walls;
   deflector means positionable between a stowed position external to said exhaust stream flow path and a deployed position further defining said exhaust stream flow path; and
   variable position first flap means partially defining a second of said walls, and wherein:
   said convergent-divergent means and said second wall cooperate to define a variable area throat therebetween when said deflector is stowed;
   said convergent-divergent means and said first flap means provide variable exhaust stream expansion control downstream of the throat when said deflector is stowed; and
   said first flap means cooperates with said deflector means to provide the variable area throat therebetween when said deflector means is in said deployed position.

2. The flight maneuverable exhaust device of claim 1 further including second flap means further defining said first wall and adapted to provide exhaust flow expansion control and flight manuever vectoring when said deflector means is in said stowed position.

3. The flight maneuverable exhaust device of claim 2 wherein said second flap means comprises an aircraft wing flap.

4. The flight maneuverable exhaust device of claim 1 wherein:
   said first flap means comprises the downstream extremity of said second wall; and
   said deflector means is adapted to be deployed aft of said first flap thereby vectoring said exhaust stream at least partially around said first flap means.

5. The flight maneuverable exhaust device of claim 4 wherein said throat is positionable at a first location defined between said convergent-divergent means and said second wall.

6. The flight maneuverable exhaust device of claim 5 wherein said throat is adapted to rotate between said first location and a second location defined between said first flap means and said deflector means as said deflector means is rotated between said stowed position and said deployed position.

7. The flight maneuverable exhaust nozzle of claim 5 wherein said first throat location is upstream of said first flap means.

8. An exhaust device for a gas turbine engine comprising:
   a plurality of substantially opposed walls partially defining an exhaust stream flow path having a throat;
   variable position convergent-divergent means partially defining a first of said walls;
   first flap means of the variable position variety, downstream of the throat, partially defining a second of said walls and, in a first operating mode, cooperating with said convergent-divergent means to provide variable exhaust stream expansion control;
   second flap means of the variable position variety disposed downstream of said convergent-divergent means and, in the first operating mode, further defining said first wall and cooperating with said convergent-divergent means to provide additional exhaust stream expansion control; and
   deflector means, positionable between a stowed position external to said exhaust stream flow path and a deployed position aft of the downstream extremity of said second wall thereby further defining said exhaust stream flow path; wherein:
   said convergent-divergent means and said second wall cooperate to modulate the exhaust stream flow path throat area therebetween in the first operating mode.

9. The exhaust device of claim 8 wherein said deflector means is stowed during said first operating mode.

10. The exhaust device of claim 9 wherein, during a second operating mode:
    said deflector means is stowed; and said second flap means is adapted to be positioned to deflect the exhaust stream to provide flight maneuver vectoring.

11. An exhaust device for a gas turbine engine comprising:
a plurality of substantially opposed walls partially defining an exhaust stream flow path having a throat;
convergent-divergent means including cooperating variable position convergent and divergent flap means connected to actuating means and partially defining a first of said walls;
first flap means of the variable position variety partially defining a second of said walls and, in a first operating mode, adapted to provide exhaust stream expansion control;
second flap means of the variable position variety disposed downstream of and, in the first operating mode, further defining said first wall and cooperating with said convergent-divergent means to provide additional exhaust stream expansion control; and
deflector means, positionable between a stowed position within said first wall in the first operating mode, and between said convergent-divergent means and said second flap means, aft of the downstream extremity of said second wall, in a second operating mode, thereby further defining said exhaust stream flow path, wherein
said throat is positionable at a first location between said convergent and divergent flap means and said second wall, upstream of said first flap means, during said first operating mode.

12. The exhaust device of claim 11 wherein, during a third operating mode:
said deflector means is deployed; and
said first flap means cooperates with said deflector means to define the throat therebetween.

13. The exhaust device of claiim 11 wherein said throat is adapted to rotate between a first position partially defined by said convergent-divergent means when said deflector is stowed and a second position between said deflector and said first flap when said deflector is deployed.

* * * * *